June 30, 1959  C. H. HOLSCLAW  2,892,479
PIVOTED SWEEPARM TUBE BENDER HAVING BENDING SHOE
ACTUATED BY QUADRILATERAL LINKAGE
Filed Oct. 27, 1955  2 Sheets-Sheet 2
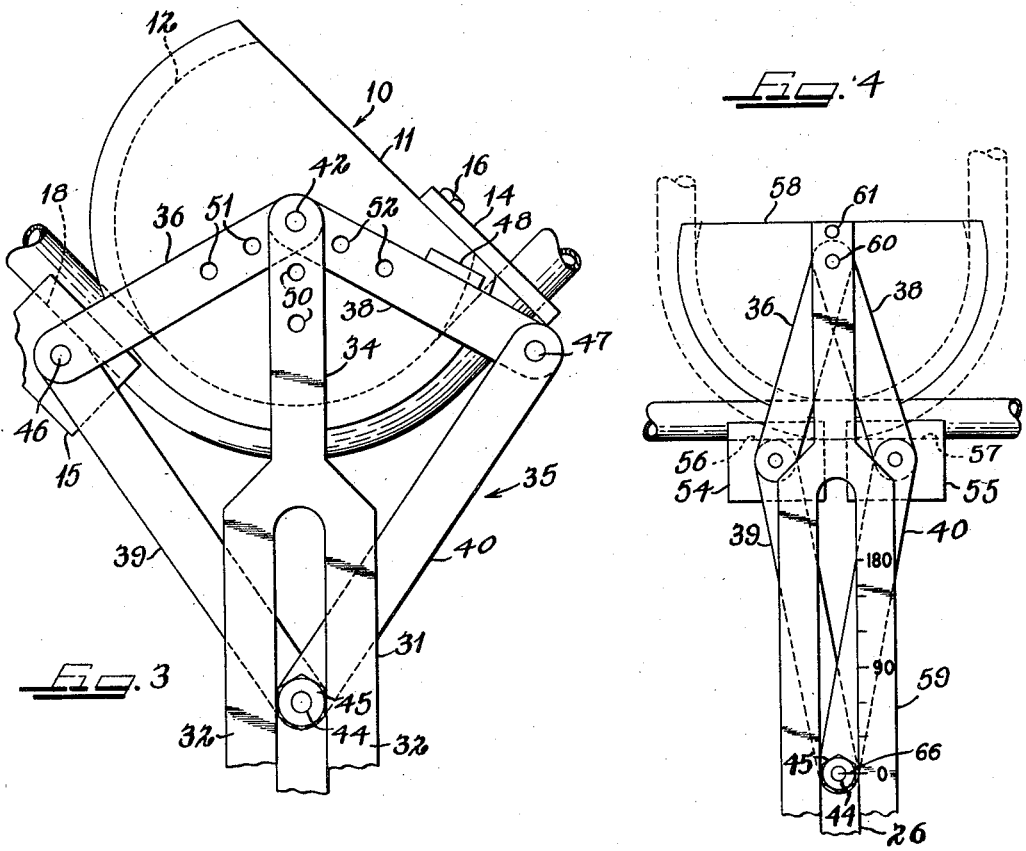
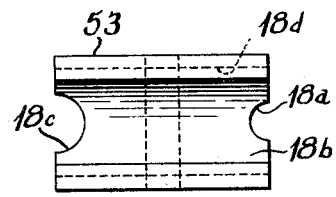
Inventor
CHARLES H. HOLSCLAW
By
Carlson, Pitzner, Hubbard & Wolfe
Attys United States Patent Office 2,892,479
Patented June 30, 1959

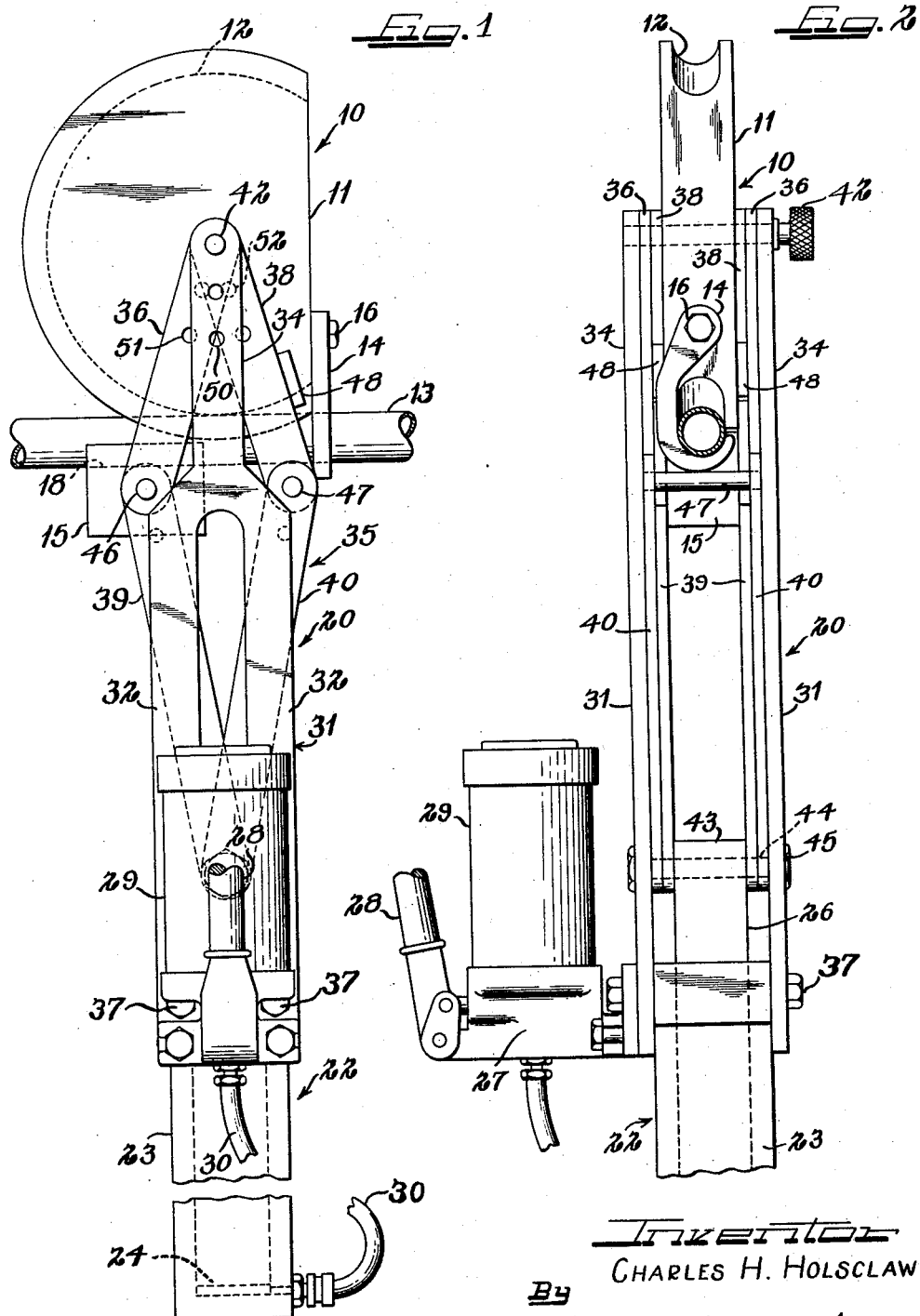

2,892,479

PIVOTED SWEEPARM TUBE BENDER HAVING BENDING SHOE ACTUATED BY QUADRILATERAL LINKAGE

Charles H. Holsclaw, Evansville, Ind.

Application October 27, 1955, Serial No. 543,071

2 Claims. (Cl. 153—46)

The present invention relates to a device for bending pipe and tubing, or other elongated cylindrical workpieces.

It is an object of the present invention to provide a new and improved device capable of bending elongated cylindrical workpieces, such as pipe, rods and tubing with a minimum of effort.

In the field installation of piping and tubing, the workmen have heretofore been confronted with the necessity of having pipes and tubes of large diameters, say of one inch or more, bent to desired shape in a shop or plant remote from the installation, or at other place having a stationary power-driven pipe and tube bender capable of handling workpieces of the larger diameters. It is, therefore, an object of the present invention to provide a bending device for elongated cylindrical objects which is capable of being constructed in portable form and still handle pipes and tubing of large diameters. It is a related object to provide a bender which may be carried and operated by one man for use in the field in piping and tubing installations.

It is another object to provide a bender of the above type which is capable of bending at a more rapid rate than conventional tools employed for this purpose.

A more detailed object of the invention is to utilize a quadrilateral linkage cooperating with a circular body or anvil for bending elongated cylindrical objects. A further object of the invention is to provide a pipe bender utilizing a toggle-like linkage which is capable of use with a power actuator and which produces a novel variation in force and speed over the operating cycle.

Other objects and advantages of the present invention will become apparent as the following written description, taken in connection with the accompanying drawings proceeds, in which:

Fig. 1 is a front elevation of a pipe bender embodying the present invention;

Fig. 2 is a side elevation of Fig. 1;

Fig. 3 is a partial front elevation of the bender of Fig. 1, showing the parts of the bender in position after producing a bend in a length of pipe;

Fig. 4 is a partial front elevation of a modified form of the bender embodying the present invention;

Fig. 5 is a side view of a bender shoe for use in a bender embodying the present invention and which is capable of accommodating various sizes of pipe.

While the invention is susceptible of various modifications and alternative constructions, there are shown in the drawings and herein will be described in detail, the preferred embodiments, but it is to be understood that the intention is not thereby to limit the invention to the specific forms disclosed, but the intention is to cover all modifications and alternative constructions falling within the scope and spirit of the invention as expressed in the appended claims.

Referring more specifically to Figs. 1 and 2 of the drawings, the invention is there exemplified in an illustrative pipe bender 10 which comprises a bending anvil or body member 11 having an arcuately-shaped edge provided with a groove 12 into which a length of pipe 13 may be bent. The arc of the groove 12 determines the minimum curvature of the bend in the pipe after the bending operation is completed.

Associated with the body member 11 for forcibly bending a length of pipe into the groove 12 is means which includes a pair of members movable relative to each other and in opposite directions in an arcuate path about the periphery of the body member 11. In the embodiment of the invention illustrated in Figs. 1 and 2, this means comprises a retaining member or hook 14 positioned adjacent one end of the groove 12 and a pressing member or shoe 15. The hook 14 is pivotally secured to the body 11 as by means of a pivot screw 16 which permits the hook 14 to swing transversely into a closed position over the open side of the groove 12 upon an axis which is generally parallel to the tangent of the groove 12 at the point of pivoting. The hook 14, when swung away from the groove 12 to open position permits a length of pipe 13 to be inserted into the groove and when swung into closed position holds the length of pipe in the groove 12 for bending.

Cooperating with the hook 14 to bend the pipe is the pressing or bending shoe 15, which is positioned adjacent the arcuate edge of the body 11 in overlying relation to the groove 12. Provided in the side wall of the shoe 15, which faces the groove 12 is a mating groove 18. The mating groove 18 preferably has a straight axis and a cross-sectional radius substantially equal to that of the arcuate groove 12. The radii of the grooves 12, 18 are selected to provide between them a circular opening of substantially the same diameter as the outside diameter of the pipe to be bent.

With a length of pipe 13 in the groove 12 and with the hook 14 in closed position, the portion of the pipe 13 between the hook 14 and the body 11 is effectively held in the groove 12 against both transverse and axial movement. Subsequent relative movement of the hook 14 and bending shoe 15 in opposite directions causes the shoe 15 to press progressively succeeding portions of the pipe 13 into the groove 12 until a sufficient length of pipe has been pressed into the groove 12 to produce the desired angle of bending. As shown in the drawings, the body 11 of the bender is slightly longer in outline than a semicircle, thus providing arcuate groove 12 with something over 180° in length to take into account resilient "spring back" of the pipe and permit a full reverse or 180° bend to be made if desired.

In accordance with the invention, means are provided for forceably driving the relatively movable members along an arcuate path but in opposite directions. To this end, the bender 10 is provided with a frame 20 at one end of which is fastened the body 11 and at the other end of which is fastened an actuator 22 for driving the movable members. The actuator may be any power means such as a force multiplying means having a driven member which is powered to be moved toward the center of the body 11 and is retractable therefrom.

In the present instance, the power means comprises a hydraulic ram or jack having a cylinder 23 which is rigidly fastened to the bender frame 20 and a piston or ram 24 having a piston rod or axial projection 26 extending in the direction of the bender body 11. The construction of such a hydraulic jack is well known and need not be described in detail. For present purposes, it is sufficient to point out that a hydraulic pump 27 is operated by a hand lever 28 and supplies fluid under pressure from a reservoir 29 through a conduit 30 to the hydraulic cylinder 23. The supply of pressure fluid to the cylinder 23 forces the piston or ram 24 and the piston rod 26 toward the bender body 11. A release or reversing valve (not shown) is provided on the pump 27 to permit oil trapped in the cylinder 23 to flow back to the reservoir 29 when the piston rod is to be retracted. It will be understood that other types of power devices, such as mechanical screw jacks or levers, as well as electrically driven power mechanisms, may be used in place of the hydraulic mechanism illustrated in the drawings.

As shown in the drawings, the frame 20 of the bender comprises a pair of tensile frame members 31, one being positioned on each side of the bender body 11 and the power cylinder 23. The frame members 31 in the illustrative embodiment of the invention are bifurcated plates resembling the well known tuning fork in outline, and having a pair of spaced parallel legs 32 which merge at one end to form a stem portion 34. The outer ends of the legs 32 are connected to the hydraulic cylinder 23 as by bolts 37. In the form of bender shown in Fig. 1, the bender body 11 is pivotally fastened to the frame stem 33 for pivotal swing relative to the frame and actuator about the central axis of the body. The reason for such pivotal mounting will be explained hereinafter.

To guide the relatively movable bending members and to forceably move them, the body 11 and relative movable members 14, 15, and the driven element of the power actuator 22 are interconnected by a quadrilateral toggle-like linkage 35. The linkage comprises a first pair of interconnected guiding links 36, 38 and a second pair of interconnected power links 39, 40. The first or guiding pair of links 36, 38 are pivotally connected at their common juncture to the bending frame 20 for swing about the central axis of the bender body 11. In the embodiment of the invention illustrated in the drawings, a common pivot pin 42 supports both the first pair of links 36, 38 and the body 11 on the frame members 31. The second or power pair of links 39, 40 are pivotally connected at their common juncture to the driven element of the power actuator 22. In the present instance, a crosshead portion 43 of the piston rod 26 and the links 39, 40 are interconnected by means of a pivot pin 44.

In one feature of the invention, means are provided for guiding the linkage power connection or pivot pin 44, and the piston rod 26, in a straight line motion. For this purpose, the ends of the pivot pin 44 may, if desired, be adapted for guiding the piston rod and the interconnected ends of the power links 39, 40 in a straight line motion toward and from the bender body 11. As shown in the drawings, the ends of the pivot pin 44 are provided with slide projections in the form of nuts 45 or fasteners positioned between the inner edges of the frame legs 31 and are suitably dimensioned to slide easily in the slot defined by the frame legs for guiding the piston rod and interconnecting ends of the power links 39, 40. The means for guiding the linkage and piston rod provides a lighter, more portable device since any sidewise bending tendency is resisted by both the piston rod 26 and the frame of the bender. Consequently, the movable parts may be of lighter, less bulky construction than would otherwise be required.

The inner or free ends of the first pair of links 36, 38 are pivotally connected at 46, 47 to the inner or free ends of corresponding ones of the second pair of links, 39, 40. With the links so interconnected, it will be seen by comparison of Figs. 1 and 3 of the drawings that axial movement of the piston rod 26 toward and from the bender body 11 will alternately expand and collapse the quadrillateral linkage. During the expansion and collapse of the linkage, the pivotal connections 46, 47 are moved in a common arcuate path, but in opposite directions about an axis coincident with the bender body 11. This relative movement of the pivotal connections 46, 47 is utilized to guide the bending members 14, 15 about the arcuate groove 12, and to transmit to the bending members the power supplied by the actuator 22. In the illustrative devices this is accomplished by pivotally connecting the bending shoe 15 to the linkage at one of the intermediate pivotal connections 46. By virtue of such a pivotal connection, the bending shoe 15 is moved in an arcuate path and at the same time can tilt about the pivotal connection to maintain a substantially tangential relationship to the curved longitudinal axis of the bending groove 12 of the body 11.

Movement of the other of the intermediate pivotal connections 47 between the first and second pairs of links is utilized to move the second bending member relative to the first member. In the form of bender illustrated in Fig. 1, the hook 14, which comprises the second of the bending members, is moved in an arcuate path by means of a force transmitting connection in the form of a lateral abutment 48 projecting from the side of the bender body 11 into the path of movement of the second one 38 of the first pair of links. The abutment 48 is positioned on the bender body 11 adjacent the hook 14 and near the periphery of the body 11, so that it engages the second guide link 38 in the vicinity of the second intermediate pivotal connection 47.

In operation the described mechanism operates in the following manner. The piston rod 26 and crosshead portion 43 are retracted. The length of the power applying links 39, 40 are such that in the fully retracted position, the linkage is substantially collapsed and the openings defined by the groove 12, and the overlying shoe 15 and hook 14, respectively, are in alinement to receive a straight length of pipe. For convenience in loading the bender, the hook 14 is usually swung to open position when the pipe is loaded into the bender and then moved to the closed pipe retaining position.

Power is now applied to the actuator 22 causing the piston rod 26 and crosshead portion 43 to move in a straight line toward the bender body 11. The quadrilateral linkage 35 is expanded, moving the pivotal joints 46 and 47 in opposite directions and forcing the hook 14, lateral abutment 48 and bender body to move in an arcuate path in one direction and the bender shoe 15 to move in an arcuate path in the opposite direction. The hook member 14 has a tendency to grip the pipe and to hold it from slipping axially relative to the bending groove 12. Thus, as the toggle-like linkage is expanded, the length of pipe is pulled by the hook member 14 in an arc upwardly and to the right as viewed in Fig. 1 of the drawings. At the same time the bending shoe 15 moves in an arcuate path upwardly and to the left progressively pressing succeeding portions of the pipe into the bending groove 12. The shoe 15 slides along the surface of the pipe until a sufficient length of pipe has been pressed into the bending groove 12 to provide the desired angle of bend. The piston rod 26 and crosshead 43 may now be moved to their retracted position and the bent pipe removed from the bender by opening the hook member 14.

Preferably the pivot pin 42 for connecting the body 11 to the bender frame 20 is removable so that the body 11 may be detached from the bender both to permit easy removal of the pipe and to alow bodies of different diameters and groove sizes to be used. To accommodate body members of different diameters, the stem portion 34 of the bender frame, and the first or guide pair of links 36, 38 are each provided along their lengths with a series of holes 50, 51, 52. Three such holes for each series are shown in the drawings to accommodate three sizes of bender bodies. When a body 11 of smaller diameter than that shown in the drawings is to be used, the removal pivot pin 42 is inserted in the second or third ones of the holes 50, 51, 52, which holes are so spaced in relation to the radius of the body to be used that the bending shoe 15 is maintained closely adjacent the periphery of the body 11 as previously explained.

To bend pipes or tubing of various outside diameters, body members 11 may be inserted having groove sizes corresponding to the selected pipe size. In this connection, the shoe 15 may conveniently be formed with grooves of more than one size. As shown in Fig. 5 of the drawings, a bending shoe 53 is provided with four grooves, 18a 18b, 18c, 18d, of different radii to accommodate pipes of four different diameters. In operation, it is merely necessary to rotate the shoe 53 about its pivotal connection to the linkage until that one of the pipe-receiving grooves corersponding to the size of the groove 12 in the body 11 faces the periphery of the body member 11.

In a modified form of invention shown in Fig. 4 of the drawings, the relatively movable bending members comprise a pair of shoes 54, 55, each having a pipe receiving groove 56, 57. The shoes 54, 55 are pivotally mounted on the quadrilateral linkage 35 at respective ones of the intermediate pivotal connections in the same manner as the shoe 15 of the construction shown in Figs. 1–3. For this purpose the guide links are constructed of equal length so that the shoes 54, 55 move in a common arcuate path. It will be understood, however, that the shoes 54, 55 may be connected to the guide links 36, 38 independently of the intermediate pivotal connections between the links. In this modified form of the invention, the shoes 54, 55 are guided about the periphery of the body 58 by the guide links 36, 38 and are forced or moved in opposite directions by virtue of the actuator pressing the piston rod 26 toward the body 58. The body 58 may if desired be held stationary relative to the frame 59 since it need not pivot to perform the bending operation. For the latter purpose a pair of coupling pins 60, 61 may be used to interconnect the frame 59 and body 58, the inner one 60 of the pins also serving as the pivotal connection for the guiding links 36, 38.

When loading pipe into the bender shown in Fig. 4, the portion of the pipe which is to constitute the center of the finished bend is placed between the shoes 54, 55 when the linkage is in its collapsed condition, that is with the actuator retracted. In operation, both shoes 54, 55 have a tendency to slide along the pipe while the latter remains substantially stationary relative to the bender body 56. Thus, portions of the pipe on both sides of the center of the bending body are progressively pressed into the bending groove.

One of the advantageous features of the described construction resides in the convenient means provided for determining the angle of bend placed in a pipe. As seen with reference to Fig. 4 of the drawings, indicia may be placed along a leg of the bender frame 59 to indicate degrees of bend from zero to one hundred eighty degrees. A reference mark 66 cooperating with the indicia is placed on the pivot pin 44. As the pin 44 and piston rod 26 move the toggle linkage from fully retracted position, corresponding to zero degrees bend to full expanded position, corresponding to one hundred eighty degree bend, the reference mark 66 traverses the linear distance from the zero to one hundred eighty degree indicia on the frame. Intermediate indicia indicate lesser degrees of bend to provide a simple, easily used means of measuring the amount of bend desired.

It will be apparent to one skilled in the art, with the teachings in mind, that one may employ links 39, 40 which consist of a single bifurcated piece in the interest of economy, and that such links may be made somewhat shorter than shown in the drawings to decrease the applied force necessary to start the bending, without departing from the invention.

I claim as my invention:

1. A pipe bender comprising in combination a frame, an arcuate body pivotally mounted in said frame and having a groove in the peripheral edge thereof for receiving a length of pipe, a force multiplying device mounted on said frame and having a translatable driven member movable toward and from said body in a radial direction, a pair of guide links having a common pivotal connection at one end thereof to said body and said frame, a second pair of power links having a common pivotal connection at one end thereof to said driven member, a pivotal connection at the second end of each guide link with the second end of a corresponding power link to form a quadrilateral linkage expandable upon movement of said driven member toward said body, a bending shoe pivotally connected to one of said guide links for movement in a first direction through an arcuate path about the peripheral groove of said body upon expansion of said linkage, a retaining hook on said body swingable into pipe engaging position over said groove, and a lateral abutment on said body in the path of movement of the second of said guide links for rotating said body and moving said hook through an arcuate path in a direction opposite to the movement of said shoe upon expansion of said linkage for retaining and bending a length of pipe in said groove.

2. A pipe bender as claimed in claim 1 in which said bending shoe has a plurality of sides, each side having a pipe receiving groove of a size different than that of the grooves on the other sides of said shoe to permit rotation of said shoe about the pivotal connection of the shoe for bringing a selected one of said grooves into opposed relation with the peripheral edge of said body and thereby accommodate pipes of different diameters.

References Cited in the file of this patent

UNITED STATES PATENTS

| | | |
|---|---|---|
| 1,389,856 | Brinkman | Sept. 6, 1921 |
| 1,794,689 | Holsclaw et al. | Mar. 3, 1931 |
| 1,964,550 | Abramson et al. | June 26, 1934 |
| 2,405,931 | Abramson et al. | Aug. 20, 1946 |
| 2,754,880 | Kuehlman et al. | July 17, 1956 |
| 2,763,917 | Huet | Sept. 25, 1956 |

FOREIGN PATENTS

| | | |
|---|---|---|
| 362,832 | Italy | Sept. 6, 1938 |
| 638,150 | Great Britain | Jan. 1, 1947 |
| 676,250 | Great Britain | Feb. 13, 1951 |